United States Patent [19]

Griffin, Sr.

[11] Patent Number: 4,664,407
[45] Date of Patent: May 12, 1987

[54] AIR RIDE VEHICLE FRONT SUSPENSION ASSEMBLY

[76] Inventor: Arthur D. Griffin, Sr., 1040 Cedar Ave., Croydon, Pa. 19020

[21] Appl. No.: 809,624

[22] Filed: Dec. 16, 1985

[51] Int. Cl.$^4$ .................... B60G 21/06; B60G 11/28
[52] U.S. Cl. .................................. 280/689; 280/713; 267/15 A
[58] Field of Search ............... 280/689, 672, 772, 665, 280/711, 712, 713; 267/15 A, 31, 64.27

[56] References Cited

U.S. PATENT DOCUMENTS

| 2,903,256 | 9/1959 | Weiss | 280/711 |
|---|---|---|---|
| 2,941,817 | 6/1960 | Benson | 280/713 |
| 3,031,179 | 4/1962 | Peirce | 267/64.27 |
| 3,980,316 | 9/1976 | Yates | 267/64.27 |
| 4,009,873 | 3/1977 | Sweet et al. | 267/64.27 |
| 4,097,034 | 6/1978 | Sweet et al. | 267/15 A |
| 4,174,855 | 11/1979 | Vandenberg | 267/64.27 |

Primary Examiner—John J. Love
Assistant Examiner—Karin L. Ferriter
Attorney, Agent, or Firm—Sperry, Zoda & Kane

[57] ABSTRACT

An improved vehicle front suspension assembly is disclosed utilizing pneumatic springs for use with a conventional vehicle body and frame configuration and with a conventional vehicle front axle housing and wheel assembly. A left air spring and a right air spring are included each mounted in abutment with the bottom portion of the frame of the vehicle and mounted upon the top of the axle housing of the vehicle. A stabilizer bar assembly is used having a left stabilizer bar, a right stabilizer bar and two lateral stabilizer bars, one in the rear and one in the front, which are fixedly secured with respect to the left and right stabilizer bars to form a secure overall stabilizer bar assembly. A spring support plate is fixedly secured with respect to this stabilizer assembly and is adapted to receive a front air spring mounted to the foremost top portion thereof. This front air spring if fixedly secured with respect to the frame at the upper portion thereof by being mounted directly attached to a top support member. Lateral swaying is prevented by the inclusion of a tracking bar running from the frame to the axle housing and by the firmly secured position of the front air spring.

13 Claims, 4 Drawing Figures

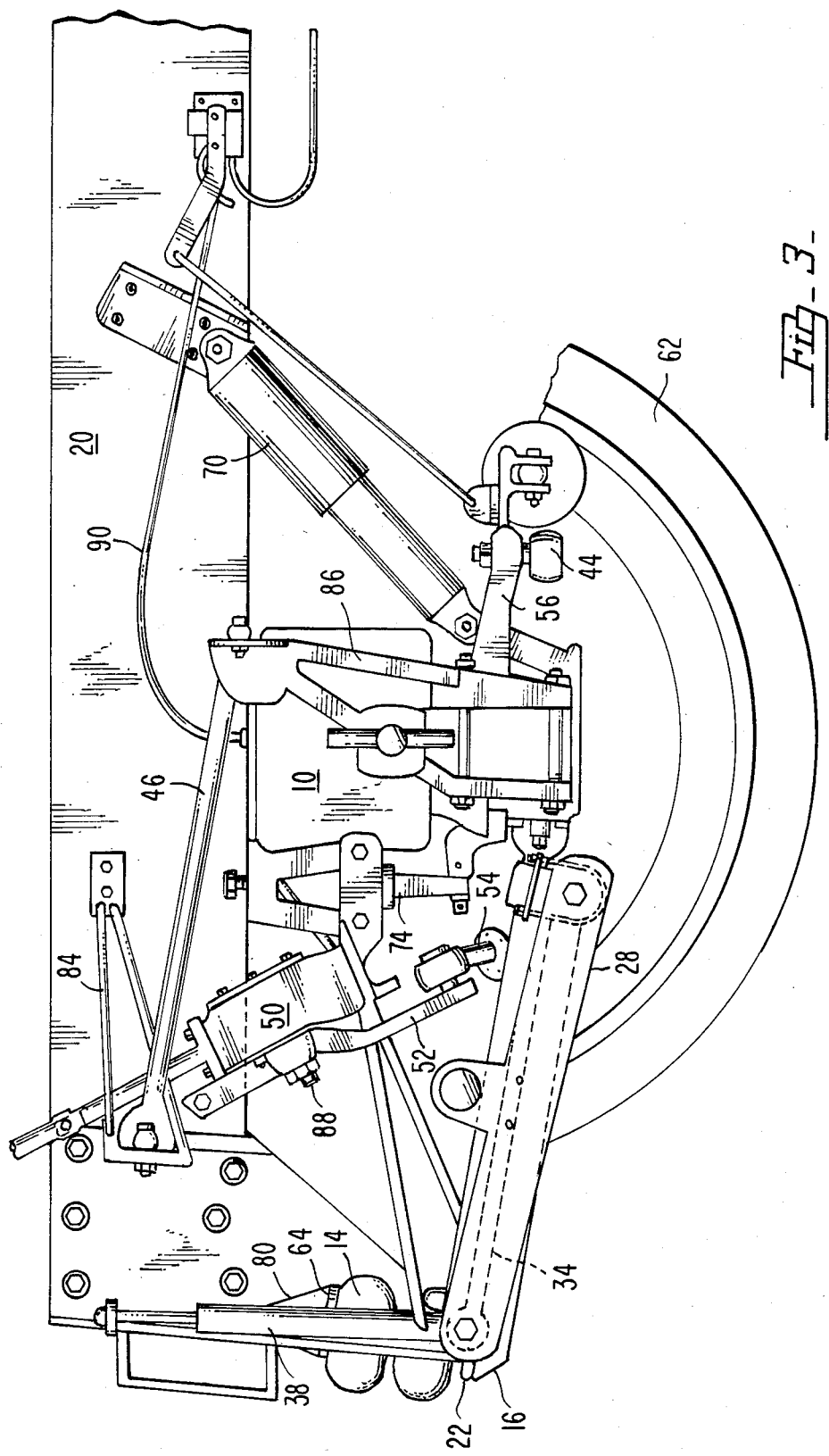

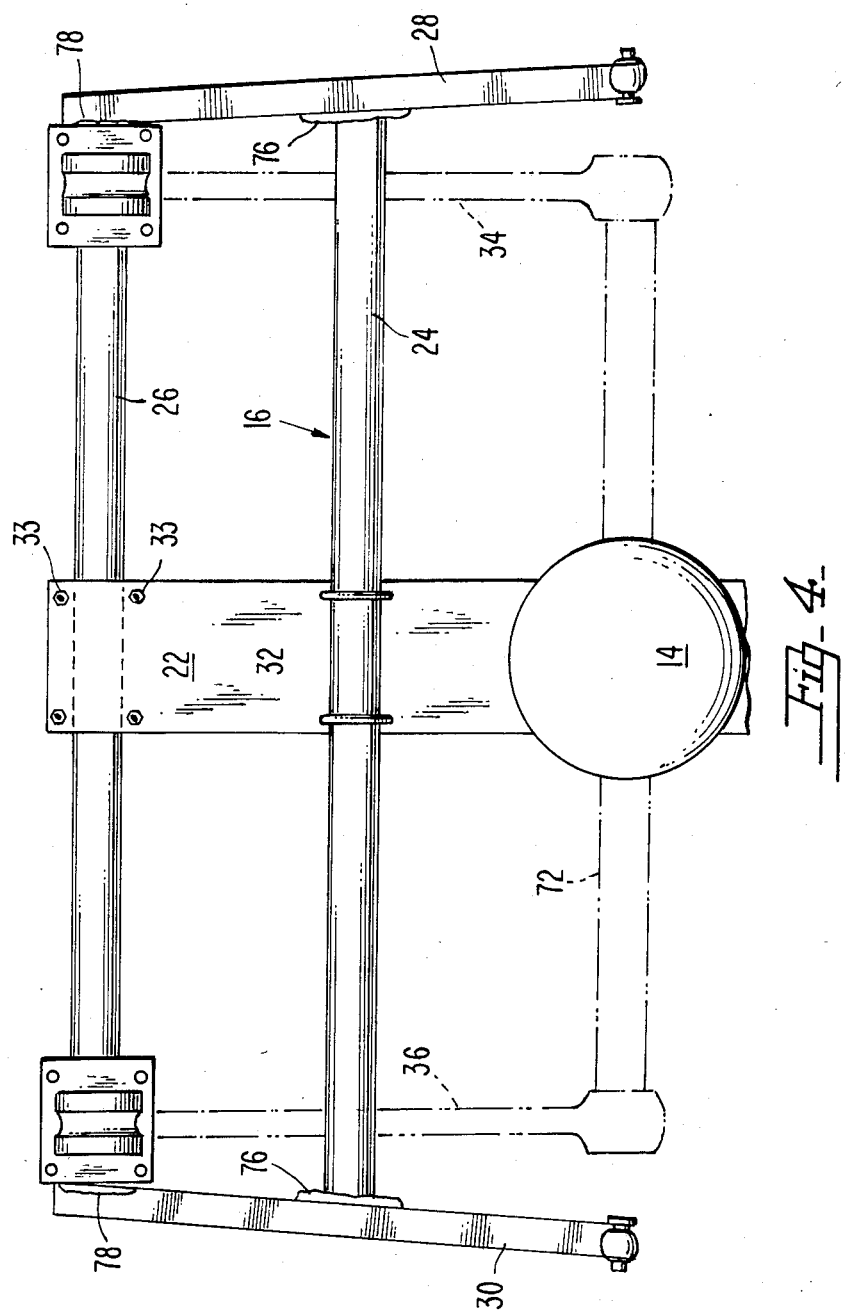

AIR RIDE VEHICLE FRONT SUSPENSION ASSEMBLY

BACKGROUND OF THE INVENTION

1. Field Of The Invention

The present invention deals with the field of suspension devices particularly usable in trucks which replace the conventional steel spring with pneumatic air bags. These air bags offer a much softer ride in such vehicles particularly such trucks and thereby reduce the continuous vibrations to which truck drivers are exposed over long distance drives and these inconveniences can become particularly annoying or dangerous.

A suspension utilizing air bags instead of springs allows for a more soft ride however there is a tendency for excessive lateral or longitudinal swaying of the body with respect to the suspension and therefore the present invention includes a novel configuration of stabilizer bars and tracking bars to prevent this movement.

2. Description Of The Prior Art

Pneumatic vehicle suspension has been utilized in a number of different types of vehicles including buses and trucks. However none has achieved the overall softness in ride and yet finds stability as is apparent with the present invention. Examples of prior attempts include U.S Pat. Nos. 3,031,179 to T. H. Peirce on a Suspension System and 3,980,316 to Jan Beryl Yates on a Roll Stabilized Vehicle Suspension System and 4,009,873 to Philip J. Sweet et al on an Air-Ride Suspension Assembly and 4,174,855 to E. Vandenberg on a Wheeled Vehicle Axle Suspension System.

SUMMARY OF THE INVENTION

An improved air ride vehicle front suspension assembly is disclosed which is particularly usable with a conventional truck configuration which includes a vehicle body and frame as well as a front axle and axle housing and wheel assembly. A left air spring is positioned within the construction of this assembly mounted with the bottom resting upon the upper left side of the front axle housing and with the top thereof in contact with respect to the bottom of the left vehicle frame rail to thereby suspend the left portion of the body and frame thereabove.

In a similar manner a right air spring is mounted with the bottom contacting the top of the right side of the front axle housing and with the top in contact with the undersurface of the right vehicle frame rail to thereby suspend the right portion of the vehicle above the front suspension.

A left lower radius rod is included secured to the frame in the left portion of the left frame rail and extending toward the rear of the vehicle. Similarly a right lower radius rod is secured with respect to the right portion of the frame and extends rearwardly. A left shock absorber has the upper mount thereof secured with respect to an upper left mounting location on the frame and a right front shock absorber is secured with the upper end thereof attached with respect to the mounting location on the upper right portion of the frame.

A supporting top member is fixedly secured with respect to the upper portions of each frame rail extends laterally therebetween across the front of the vehicle.

A stabilizer bar assembly is included having a left stabilizer bar secured with respect to the bottom of the left shock absorber and extending toward the rear of the vehicle. Similarly on the right side a right stabilizer bar is secured to the bottom of the right front shock absorber and extends rearwardly. A rear stabilizer bar is fixedly secured with respect to the left and right stabilizer bars preferably by being welded thereto at the rear portion thereof. This rear stabilizer bar extends parallel with respect to the axle housing. Another cross stabilizing bar which is called the front stabilizer bar is fixedly secured or welded at each opposite end to the left stabilizer bar and the right stabilizer bar at the approximate central area thereof to facilitate the overall stability of the stabilizer bar assembly. In this manner a four member stabilizer bar assembly is included with two outside members and two cross members all welded with respect to one another. Another portion of the stabilizer bar assembly is the spring support plate which is fixedly secured with respect to the center of the rear stabilizer bar and also fixedly secured with respect to the central portion of the front stabilizer bar and extends further forewardly therefrom to a position somewhat below the top support member to thereby define a location therebetween in which the front air spring would be mounted. The front air spring is mounted with the bottom portion in abutment with respect to the upper surface of the front end of the spring support plate and with the top surface in abutment with respect to the bottom of the top support member. In this manner the front air spring will prevent lateral or sideways swaying of the vehicle body.

A tracking bar is included which is secured at one end to the left portion of the frame and is secured to the other end to the right portion of the axle housing and extends laterally across the vehicle body approximately parallel with respect to the axle housing in such a manner as to control the lateral flexing of the vehicle body which could be otherwise possible due to the use of the pneumatic spring.

The present invention may further include a steering box which is fixedly secured with respect to the frame having a steering pinion movably mounted therein. This steering pinion is normally operated by the steering wheel of the vehicle. Attached to the steering pinion is a pitman arm such as to be movable therewith. This pitman arm is pivotally secured with respect to a drag link and the drag link is a bar which extends laterally across the vehicle to the front of the right spindle arm. The back of the right spindle arm has a tie rod end therein which attaches to the tie rod. The tie rod extends laterally across the back of the front axle housing to be secured to a left tie rod end adjacent the rear of the left wheel. This left tie rod end is pivotally secured with respect to the left spindle arm. In this manner this overall configuration allows control of steering of the vehicle by movement of the steering pinion which rotates the pitman arm thereby causing a movement of the entire assembly including the drag link, the right spindle arm, the tie rod and left and right tie rod ends, and the left spindle arm. In this manner overall control of steering and the proper tracking between the left and right wheel is achieved.

A top support plate may be included fixedly secured with respect to the frame to strengthen the top support member due to the upward pressure exerted thereon by the front air spring.

The present invention may further include front U-bolts which fixedly secure the front stabilizer bar with respect to the spring support plate and rear U-bolts which fixedly secure the rear stabilizer bar with respect to the spring support plate. Also left U-bolt means are included fixedly securing the rear portion of the left lower radius rod with respect to the rear stabilizer bar and right U-bolt means is included fixedly securing the rear portion of the right lower radius rod with respect to the rear stabilizer bar.

A left upper radius rod is included secured with respect to the frame and the axle adjacent to the left wheel. Also a right upper radius rod is included secured with respect to the frame and the axle adjacent the right wheel.

The present invention may include an air line in fluid flow communication with respect to one or more of the springs to control the pneumatic pressure therein. Furthermore the present invention includes a front cross member fixedly secured with respect to the upper portion of the frame and extending laterally across the vehicle body to facilitate firm mounting of the bottom of the air spring thereto and to allow attachment of the front portion of the spring support plate.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 3 is a side plan view of the embodiment shown in FIG. 1; and

FIG. 4 is a top plan view of an embodiment of the stabilizer bar assembly of the present invention.

DETAILED DESCRIPTION OF THE PREFERRED EMBODIMENT

Figure 1:
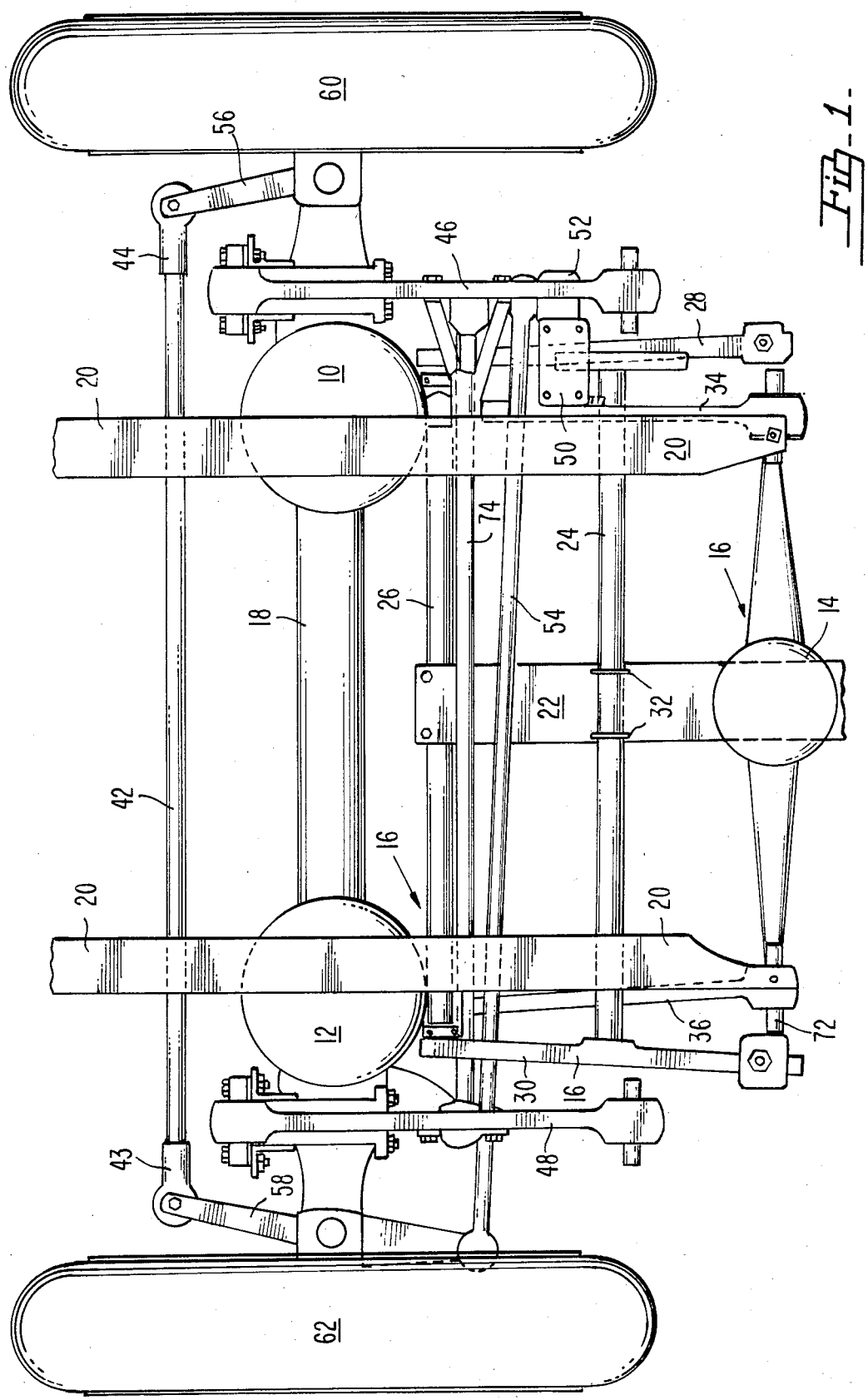
FIG. 1 is a top plan view of an embodiment of the improved air ride vehicle front suspension assembly of the present invention.

The present invention utilizes three air springs shown in FIG. 1 as left air spring 10, right air spring 12 and front air spring 14 to provide an unusually comfortable ride to vehicle which usually utilize steel springs which allow significant vibration in the vehicle body. These vehicles are normally trucks and some buses. In the present configuration the left air spring is shown immediately above the housing for axle 18 and immediately below the left rail of frame 20. The front of the vehicle is in the down direction in FIG. 1. The right air spring is shown positioned immediately above the housing for axle 18 and immediately below the right rail of frame 20.

To facilitate support of the frame with respect to the suspension while still allowing use of the soft air springs a stabilizer assembly 16 has been designed for the present invention. This stabilizer bar assembly includes a front stabilizer bar 24 which extends laterally across the vehicle and a rear stabilizer bar 26 which also extends laterally across the vehicle at a position somewhat to the rear from the front stabilizer bar. A left stabilizer bar 28 is included running longitudinally approximately below the left rail of frame 20 and a right stabilizer bar 30 is included extending approximately parallel with respect to the right rail of frame 20 but somewhat therebelow. The left stabilizer bar 28 is somewhat to the outside of the vehicle from the bottom of frame 20 and the right stabilizer bar 30 is somewhat out from the center of the vehicle or toward the right wheel from the lower portion of the frame 20. These four stabilizer bars, 24, 26, 28 and 30 are connected with respect to one another fixedly. In particular the rear stabilizer bar 26 has its left end preferably welded with respect to the rear of the left stabilizer bar 28. Similarly the right stabilizer bar 26 has a right portion thereof preferably welded with respect to the right stabilizer bar 30. Also the front stabilizer bar 24 has a left portion thereof welded with respect to the left stabilizer bar 28 and has the right portion thereof welded with respect to right stabilizer bar 30. The rear stabilizer bar 26 should be welded to the left and right stabilizer bars 28 and 30 at the rearmost portion thereof whereas the front stabilizer bar 24 should be welded to the left stabilizer bar 28 and the right stabilizer bar 30 at a position approximately in the center thereof.

A spring support plate 22 is fixedly secured with respect to the central portion of the front stabilizer bar 24 and the rear stabilizer bar 26 in such a manner that the forward section of the spring support plate extends significantly forward of the front stabilizer bar 24. Spring support plate 22 is fixedly secured with respect to rear stabilizer bar 26 by rear U-bolts 33. In a similar fashion spring support plate 22 is secured with respect to front stabilizer bar 24 by front U-bolts 32.

With this configuration the spring support plate 22 will extend forwardly from the front stabilizer bar 24 to a position immediately below top support member 64 such that an air spring can be mounted between the bottom surface of top support member 64 and the top surface of spring support plate 22. Top support member 64 is a support member extending laterally across the front of the vehicle between the opposite rails of frame 20 and fixedly secured thereto in order to withstand the upwardly exerted pressure from front air spring 14.

A left lower radius rod 34 is positioned in pivotal engagement with respect to the foremost portion of the left rail of frame 20 and extends rearwardly therefrom to be secured with respect to the axle. Left lower radius rod 34 utilizes left U-bolt means 92 to achieve this firm securement with respect to rear stabilizer bar 26.

Right lower radius rod 36 is pivotally secured with respect to the frontmost portion of the right rail of frame 20 and extends rearwardly therefrom to be fixedly secured with respect to the rightmost portion of the axle. This firm securement is achieved by right U-bolt means 94 which extend about rear stabilizer bar 26 to fixedly secure the right lower radius rod 36 thereto.

A left front shock absorber 38 is positioned with the upper portion thereof secured to the upper portion of the left rail of frame 20 and with the bottom portion thereof secured with respect to the front end of left stabilizer bar 28. A right front shock absorber 40 is positioned with the upper portion thereof secured with respect to the upper portion of the right rail of frame 20 and with the lower portion thereof secured with respect to the front end of right stabilizer bar 30.

The configuration of the stabilizer bar assembly 16 in combination with the left lower radius rod 34 and the right lower radius rod 36 and the front air spring 14 is shown best in FIG. 4. This overall configuration provides the element of stability to prevent the lateral or longitudinal swaying of the vehicle. With the shock absorbers attached to the front ends of the left and right stabilizer bars 28 and 30 and with the front of the radius rods secured with respect to the front ends of the frame, the front air spring 14 which is mounted atop the front end of spring support plate 22 can control the swaying since the top end is secured to the top support member 64. The front air spring 14 actually does not support the body in a similar fashion as do the left and rear air springs 10 and 12. On the other hand the front air spring 14 controls swaying of the body which would otherwise be possible due to the replacement of normal metal springs by air springs 10 and 12.

To control steering a left spindle arm 56 is mounted with respect to the left wheel 60 and a right spindle arm 58 is mounted with respect to the right wheel 62. The rearmost ends of these spindle arms are connected with respect to one another by a tie rod assembly which includes tie rod 42 and right tie rod end 43 and left tie rod end 44. Right tie rod end 43 is pivotally secured with respect to the rear end of right spindle arm 58 and left tie rod end 44 is pivotally secured with respect to the rearmost portion of left spindle arm 56. The tie rod 42 extends between these tie rod ends to maintain proper tracking of the wheels 60 and 62 such that they are always pointing in the same direction. This steering is achieved by a steering box 50 which is fixedly secured with respect to the frame and includes a steering pinion movably mounted therein. This steering pinion is normally operated by the vehicle steering wheel. A pitman arm 52 is secured to the steering pinion 88 to be movable therewith. A drag link 54 is secured at one end to the pitman arm and at the opposite end to the front end of right spindle arm 58. With this configuration movement of the steering wheel will cause associated movement of steering pinion 88 and result in pivotal movement of pitman arm 52. As shown in FIG. 1 the drag link will then move to the left or to the right causing desired coordinated movement of spindle arms 56 and 58 with respect to one another.

A left rear shock absorber 70 may be included as shown best in FIG. 3 extending from the frame 20 to the rear portion of the housing of axle 18.

A most important element of the present invention is tracking bar 74. This tracking bar is connected as shown in FIG. 1 at one end to the frame and at the other end to the front portion of the housing of axle 18. This tracking bar 74 could be attached in a variety of means but one end must be attached to the frame and the other end must be attached to the axle housing. The tracking bar prevents lateral swaying which would otherwise be possible due to the usage of air springs 10 and 12 rather than conventional steel springs.

A front cross member 72 is included fixedly secured with respect to the frame at each opposite end thereof and extending from the right rail to the left rail of frame 20 across the front portion thereof. This front cross member 72 can be secured with respect to the bottom of the front spring 14 and with respect to the frontmost portion of spring plate 22 in such a manner as to give added support to the bottom mounting of front air spring 14.

To facilitate this stability as described above the front stabilizer bar 24 should be welded as shown by weld connections 76 with respect to the left stabilizer bar 28 and the right stabilizer bar 30. Similarly the rear stabilizer bar 26 can be welded by weld connections 78 with respect to the left stabilizer bar 28 and the right stabilizer bar 30.

Since the frame does not truly extend across the front of the vehicle between the rails of frame 20 it is preferable that the top support member 64 be strengthened by means of top support member braces 80. In a similar manner the front cross member 72 should be strengthened by front cross member braces 82 positioned immediately therebelow.

A left upper radius rod 46 is included extending between the upper portion of the left rail of frame 20 and a bracket 86. Bracket 86 is fixedly secured with respect to the axle housing. In a similar fashion the right upper radius rod 48 has the front portion thereof fixedly secured with respect to the top radius rod bracket 86 secured with respect to the right rail of frame 20. The other end of right upper radius rod 48 is secured with respect to another bracket 86 which is secured with respect to the housing of axle 18.

To control the amount of vertically directed pressure exerted by left air spring 10, right air spring 12 and front air spring 14 it is possible to utilize an air line 90 which can vary the pressure therein or the balance of the pressure between the various springs to assure proper leveling.

Figure 2:
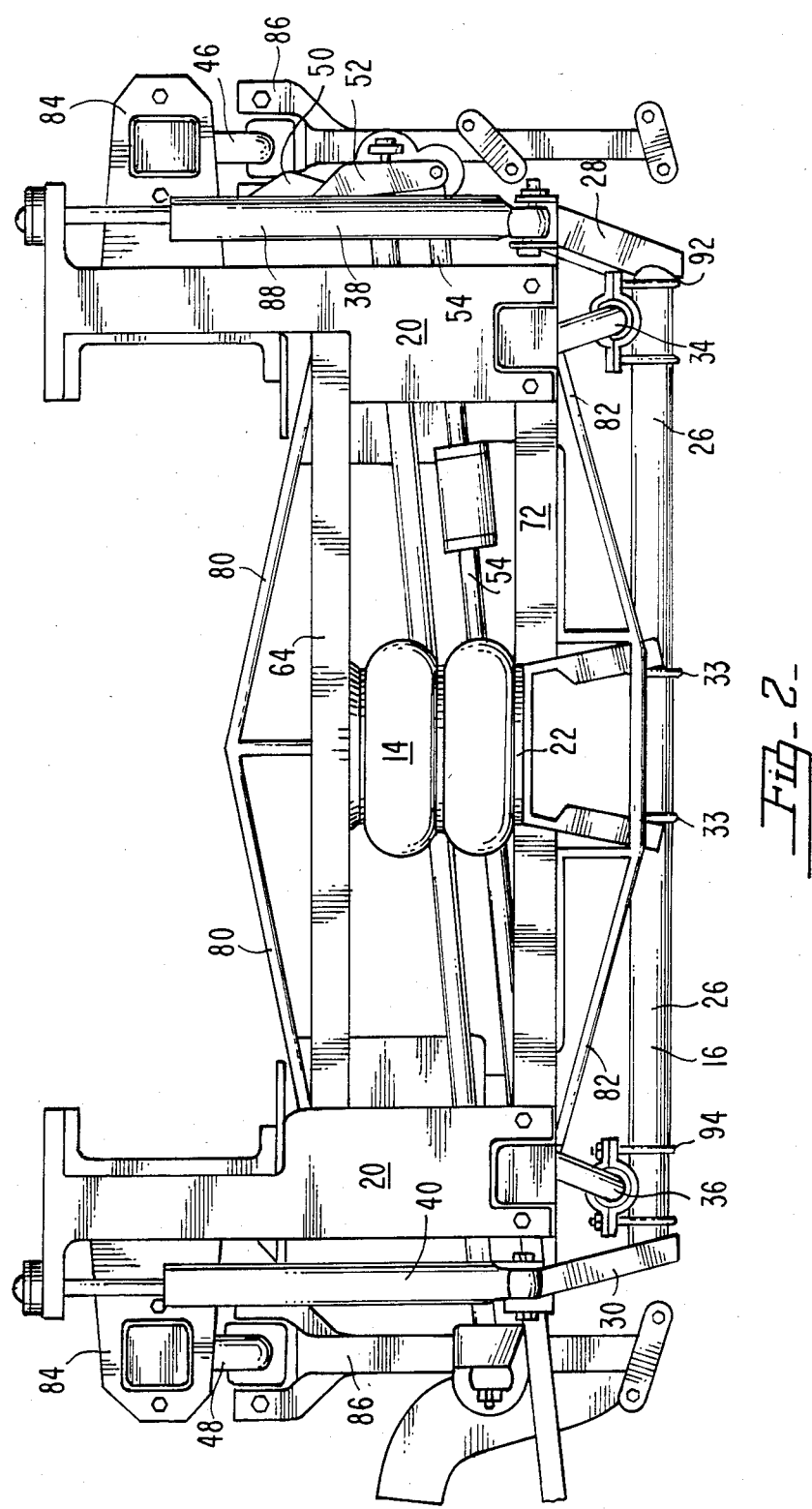
FIG. 2 is a front plan view of the embodiment shown in FIG. 1.

The radius rods of the present application are connected to the rear stabilizer bars by way of left and right U-bolts 92 and 94 as best shown in FIG. 2. These U-bolt configurations secure the rear stabilizer bar with respect to the shaft of the left and right radius rods. The radius rods themselves are bolted or otherwise directly connected at the rearmost ends thereof with respect to the axle 18. In this manner the rear stabilizer bar 26 and therefore the entire stabilizer assembly 16 is secured with respect to axle 18 to facilitate stablization thereof.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An improved air ride vehicle front suspension assembly, for use with a conventional vehicle body and vehicle frame and front axle housing and wheel assembly, the housing defining an upper portion along the upper surface thereof and a bottom portion along the lower surface thereof and a left portion and a right portion laterally therealong, wherein the improved assembly comprises:
    (a) a left air spring defining a top on the upper portion thereof and a bottom on the lower portion thereof, said left air spring being mounted with the bottom thereof in abutment with respect to the top left portion of the front axle housing and with the top thereof in supporting abutment with respect to the vehicle frame to suspend the vehicle body and frame thereabove;
    (b) a right air spring defining a top on the upper portion thereof and a bottom on the lower portion thereof, said right air spring being mounted with the bottom thereof in abutment with respect to the top right portion of the front axle housing and with the top thereof in supporting abutment with respect to the vehicle frame to suspend the vehicle body and frame thereabove;
    (c) a left lower radius rod fixedly secured with respect to the frame and extending rearwardly therefrom and being fixedly secured with respect to the front axle;
(d) a right lower radius rod fixedly secured with respect to the frame and extending rearwardly therefrom and being fixedly secured with respect to the front axle;
(e) a left front shock absorber being secured with respect to the frame;
(f) a right front shock absorber being secured with respect to the upper right portion of the frame;
(g) a top support member rigidly secured with respect to the upper portions of the frame and extending laterally across the front of the vehicle in a direction parallel with respect to the axis of the axle housing;
(h) a stabilizer bar assembly comprising:
  (1) a left stabilizer bar secured to said left front shock absorber and extending rearwardly therefrom;
  (2) a right stabilizer bar secured to said right front shock absorber and extending rearwardly therefrom;
  (3) a rear stabilizer bar fixedly secured at one end to the rear portion of said left stabilizer bar and fixedly secured at the other end to the rear portion of said right stabilizer bar and extending parallel with respect to the axle housing, said rear stabilizer bar being secured with respect to said left stabilizer bar and with respect to said right stabilizer bar to therefore also be secured with respect to said front axle to provide fixed securement between said stabilizer bar assembly and said front axle;
  (4) a front stabilizer bar fixedly secured at one end to the intermediate portion of said left stabilizer bar and fixedly secured at the other end to the intermediate portion of said right stabilizer bar and extending parallel with respect to the axle housing;
  (5) a spring support plate fixedly secured with respect to the central portion of said rear stabilizer bar and fixedly secured with respect to the central portion of said front stabilizer bar and extending forwardly therefrom to a position spatially disposed from and immediately below said top support member;
(i) a front air spring defining a top portion on the upper surface thereof and a bottom portion on the lower surface thereof, said front air spring being mounted with the bottom portion thereof in abutment with respect to said spring support plate and with the top portion thereof in abutment with respect to said top support member; and
(j) a tracking bar secured at one end to the frame and secured at the other end to the axle housing to extend laterally across the vehicle body approximately parallel with respect to the axle housing to control lateral of the vehicle body.

2. The assembly as defined in claim 1 further including:
  (a) a steering box secured with respect to the frame, including a steering pinion movably mounted extending outwardly therefrom;
  (b) a pitman arm fixedly secured with respect to said steering pinion to be movable therewith;
  (c) a left spindle arm secured with respect to the left wheel and the axle housing;
  (d) a right spindle arm secured with respect to the right wheel and the axle housing;
  (e) a left tie rod end pivotally secured with respect to the rear end of said left spindle arm;
  (f) a right tie rod end pivotally secured with respect to the rear end of said right spindle arm;
  (g) a tie rod extending rigidly between and attached to said left tie rod end and said right tie rod end; and
  (h) a drag link secured at one end to the front end of said right spindle arm and secured at the other end to said pitman arm to cause movement of said left spindle arm and said right spindle arm in coordination responsive to movement of said steering pinion.

3. The assembly as defined in claim 1 further including a top support member brace fixedly secured with respect to the frame and said top support member to strengthen same.

4. The assembly as defined in claim 1 further including front U-bolts fixedly securing said front stabilizer bar with respect to said spring support plate.

5. The assembly as defined in claim 1 further including rear U-bolts fixedly securing said rear stabilizer bar with respect to said spring support plate.

6. The assembly as defined in claim 1 wherein said right stabilizer bar and said left stabilizer bar are each welded with respect to said rear stabilizer bar and said front stabilizer bar.

7. The assembly as defined in claim 1 further including a left upper radius rod secured with respect to said frame and said axle adjacent the left wheel.

8. The assembly as defined in claim 1 further including a right upper radius rod secured with respect to said frame and said axle adjacent the right wheel.

9. The assembly as defined in claim 1 further including an air line in fluid flow communication with at least one of said left air spring, said right air spring and said front air spring to control pneumatic pressure therein.

10. The assembly as defined in claim 1 further including a front cross-member fixedly secured with respect to the upper portion of the frame and extending laterally across the vehicle body parallel with respect to the axle housing immediately below the front portion of said spring support plate to facilitate firm mounting of the bottom of said front air spring thereto.

11. The assembly as defined in claim 1 further including a left U-bolt means fixedly securing the rear portion of said left lower radius rod with respect to said rear stabilizer bar.

12. The assembly as defined in claim 1 further including a right U-bolt means fixedly securing the rear portion of said right lower radius rod with respect to said rear stabilizer bar.

13. An improved air ride vehicle front suspension assembly, for use with a conventional vehicle body and vehicle frame and front axle housing and wheel assembly, the housing defining an upper portion along the upper surface thereof and a bottom portion along the lower surface thereof and a left portion and a right portion laterally therealong, wherein the improved assembly comprises:
  (a) a left air spring defining a top on the upper portion thereof and a bottom on the lower portion thereof, said left air spring being mounted with the bottom thereof in abutment with respect to the top left portion of the front axle housing and with the top thereof in supporting abutment with respect to the vehicle frame to suspend the vehicle body and frame thereabove;

(b) a right air spring defining a top on the upper portion thereof and a bottom on the lower portion thereof, said right air spring being mounted with the bottom thereof in abutment with respect to the top right portion of the front axle housing and with the top thereof in supporting abutment with respect to the vehicle frame to suspend the vehicle body and frame thereabove;

(c) a left lower radius rod fixedly secured with respect to the frame and extending rearwardly therefrom and being fixedly secured with respect to the front axle;

(d) a right lower radius fixedly secured with respect to the frame and extending rearwardly therefrom and being fixedly secured with respect to the front axle;

(e) a left front shock absorber secured with respect to the frame;

(f) a right front shock absorber secured with respect to the frame;

(g) a top support member rigidly secured with respect to the upper portions of the frame and extending laterally across the front of the vehicle in a direction parallel with respect to the axis of the axle housings, said top support member further including a top support member brace fixedly secured with respect to the frame to strengthen said top support nember;

(h) a stabilizer bar assembly comprising:
  (1) a left stabilizer bar secured to said left front shock absorber and extending rearwardly therefrom;
  (2) a right stabilizer bar secured to said right front shock absorber and extending rearwardly therefrom;
  (3) a rear stabilizer bar fixedly secured by welding at one end to the rear portion of said left stabilizer bar and fixedly secured at the other end by welding to the rear portion of said right stabilizer bar and extending parallel with respect to the axle housing, said rear stabilizer bar being secured with respect to said left stabilizer bar and with respect to right stabilizer bar to therefore also be secured with respect to said front axle to provide fixed securement between said stabilizer bar assembly and said front axle;
  (4) a left U-bolt means fixedly securing the rear portion of said left lower radius rod with respect to said rear stabilizer bar;
  (5) a right U-bolt means fixedly securing the rear portion of said right lower radius rod with respect to said rear stabilizer bar;
  (6) a front stabilizer bar fixedly secured at one end to the intermediate portion of said left stabilizer bar and fixedly secured at the other end by welding to the intermediate portion of said right stabilizer bar and extending parallel with respect to the axle housing;
  (7) a spring support plate fixedly secured with respect to the central portion of said rear stabilizer bar and fixedly secured with respect to the central portion of said front stabilizer bar and extending forwardly therefrom to a position spatially disposed from and immediately below said top support member;
  (8) a right upper radius rod secured with respect to said frame and said axle adjacent the right wheel; and
  (9) an air line in fluid flow communication with respect to at least one of said left air spring, said right air spring and said front air spring to control pneumatic pressure therein;

(i) a front air spring defining a top portion on the upper surface thereof and a bottom portion on the lower surface thereof, said front air spring being mounted with the bottom portion in abutment with respect to said spring support plate and with the top portion thereof in abutment with respect to said top support member;

(j) a tracking bar secured at one end to the frame and secured at the other end to the axle housing to extend laterally across the vehicle body approximately parallel with respect to the axle housing to control lateral flexing of the vehicle body;

(k) a steering box secured with respect to the frame, including a steering pinion movably mounted extending outwardly therefrom;

(l) a pitman arm fixedly secured with respect to said steering pinion to be movable therewith;

(m) a left spindle arm secured with respect to the left wheel and the axle housing;

(o) a left tie rod end pivotally secured with respect to the rear end of said left spindle arm;

(p) a right tie rod end pivotally secured with respect to the rear end of said right spindle arm;

(q) a tie rod extending rigidly between and attached to said left tie rod end and said right tie rod end;

(r) a drag link secured at one end to the front end of said right spindle arm and secured at the other end to said pitman arm to cause movement of said left spindle arm and said right spindle arm in coordination responsive to movement of said steering pinion;

(s) a left upper radius rod secured with respect to said frame and said axle adjacent the left wheel;

(t) a right upper radius rod secured with respect to said frame and said axle adjacent the right wheel;

(u) an air line in fluid flow communication with respect to said left air spring, said right air spring and said front air spring to control pneumatic pressure therein; and (v) a front cross-member fixedly secured with respect to the upper portion of the frame and extending laterally across the vehicle body parallel with respect to the axle housing immediately below the front portion of said spring support plate to facilitate firm mounting of the bottom of said front air spring thereto.

* * * * *